(12) United States Patent
Matsuzawa et al.

(10) Patent No.: US 10,497,385 B1
(45) Date of Patent: Dec. 3, 2019

(54) MAGNETIC DISK DEVICE AND METHOD FOR SUPPRESSING DISTURBANCE COMPONENT HAVING HARMONIC

(71) Applicants: Kabushiki Kaisha Toshiba, Minato-ku, Tokyo (JP); Toshiba Electronic Devices & Storage Corporation, Minato-ku, Tokyo (JP)

(72) Inventors: Takuji Matsuzawa, Chiba (JP); Takeyori Hara, Kanagawa (JP); Takayuki Kawabe, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/247,938

(22) Filed: Jan. 15, 2019

(30) Foreign Application Priority Data

Sep. 10, 2018 (JP) .................................. 2018-168877

(51) Int. Cl.
  *G11B 5/54* (2006.01)
  *G11B 5/55* (2006.01)
  *G11B 21/10* (2006.01)

(52) U.S. Cl.
  CPC ............ *G11B 5/553* (2013.01); *G11B 21/106* (2013.01)

(58) Field of Classification Search
  CPC ... G11B 20/10009; G11B 27/36; G11B 20/10; G11B 20/1419; G11B 5/56; G11B 5/58; G11B 5/59633; G11B 5/59638; G11B 5/54

USPC ............ 360/25, 31, 39, 43, 75, 77.06, 77.01
See application file for complete search history.

(56) References Cited

U.S. PATENT DOCUMENTS

| | | | |
|---|---|---|---|
| 6,549,349 B2 | 4/2003 | Sri-Jayantha et al. | |
| 6,636,376 B1 | 10/2003 | Ho | |
| 7,564,644 B2 | 7/2009 | Kim et al. | |
| 8,059,356 B2 * | 11/2011 | Sakagami | G11B 5/5582 360/75 |
| 2004/0213100 A1 | 10/2004 | Iwashiro | |
| 2009/0296265 A1 | 12/2009 | Kisaka et al. | |

FOREIGN PATENT DOCUMENTS

JP  2009-289373 A  12/2009

* cited by examiner

*Primary Examiner* — Nabil Z Hindi
(74) *Attorney, Agent, or Firm* — White & Case LLP (57) ABSTRACT

According to one embodiment, a magnetic disk device includes a disk, a head, and a controller that estimates a first frequency component resulting from a disturbance in a first range of a frequency corresponding to the disturbance in a signal with the disturbance, estimates a second frequency component corresponding to a second frequency of a positive integral multiple of 2 or larger of a first frequency of the first frequency component in a second range different from the first range, and suppresses a first harmonic component corresponding to the positive integral multiple of the first frequency in a position error of a target position of the head on the disk.

20 Claims, 5 Drawing Sheets

MAGNETIC DISK DEVICE AND METHOD FOR SUPPRESSING DISTURBANCE COMPONENT HAVING HARMONIC

CROSS-REFERENCE TO RELATED APPLICATIONS

This application is based upon and claims the benefit of priority from Japanese Patent Application No. 2018-168877, filed Sep. 10, 2018, the entire contents of which are incorporated herein by reference.

FIELD

Embodiments described herein relate generally to a magnetic disk device and a method for suppressing a disturbance component having a harmonic.

BACKGROUND

The magnetic disk device has a magnetic disk provided in a housing, a spindle motor that supports and rotationally drives the magnetic disk, an arm equipped with a magnetic head, and a voice coil motor. The magnetic disk device can be caused to vibrate by a disturbance, for example, the rotation of a cooling fan provided in a server. When the magnetic disk device vibrates due to such a disturbance, there is a possibility that the positioning error of the magnetic head becomes large.

DETAILED DESCRIPTION

In general, according to one embodiment, a magnetic disk device comprises: a disk; a head that writes data into the disk and reads data from the disk; and a controller that estimates a first frequency component resulting from a disturbance in a first range of a frequency corresponding to the disturbance in a signal with the disturbance, when having estimated the first frequency component, estimates a second frequency component corresponding to a second frequency of a positive integral multiple of 2 or larger of a first frequency of the first frequency component in a second range different from the first range, and when having estimated the second frequency component, suppresses a first harmonic component corresponding to the positive integral multiple of the first frequency in a position error of a target position of the head on the disk.

According to another embodiment, a method for suppressing a disturbance component with a harmonic, the method being applied to a magnetic disk device including a disk and a head that writes data into the disk and reads data from the disk, the method comprises: estimating a first frequency component resulting from a disturbance in a first range of a frequency corresponding to the disturbance in a signal with the disturbance; when having estimated the first frequency component, estimating a second frequency component corresponding to a second frequency of a positive integral multiple of 2 or larger of a first frequency of the first frequency component in a second range different from the first range; and when having estimated the second frequency component, suppressing a first harmonic component corresponding to the positive integral multiple of the first frequency in a position error in a target position of the head on the disk.

An embodiment will be described below with reference to the drawings. The drawings are mere examples and are not intended to limit the scope of the invention.

EMBODIMENT

Figure 1:
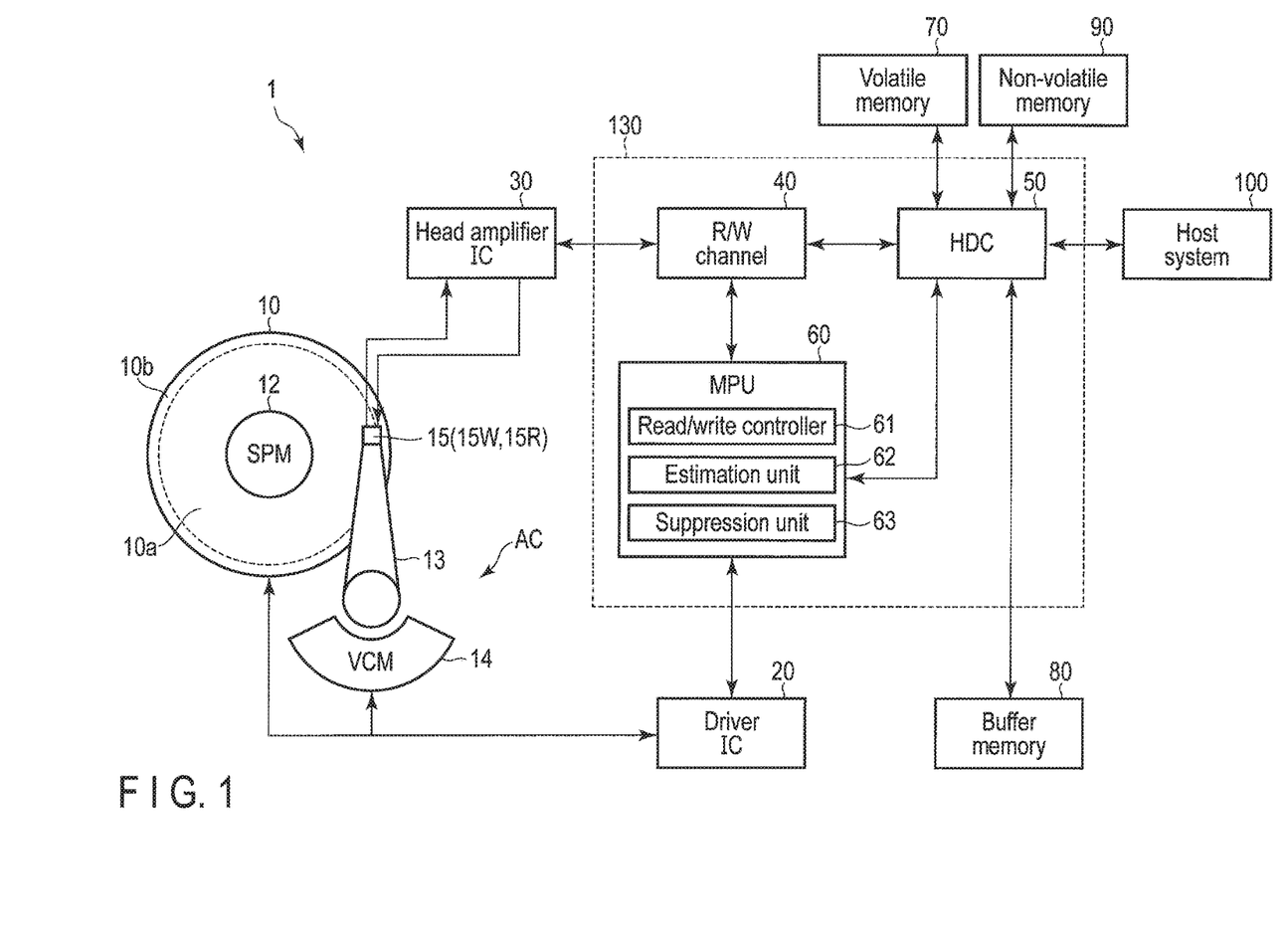
FIG. 1 is a block diagram illustrating a configuration of a magnetic disk device according to an embodiment.

FIG. 1 is a block diagram illustrating a configuration of a magnetic disk device 1 according to an embodiment.

The magnetic disk device 1 includes a head disk assembly (HDA), a driver IC 20, a head amplifier integrated circuit (hereinafter, called head amplifier IC or pre-amplifier) 30, a volatile memory 70, a buffer memory (buffer) 80, a non-volatile memory 90, and a system controller 130 as one-chip integrated circuit described later. The magnetic disk device 1 is connected to a host system (hereinafter, simply called host) 100. The magnetic disk device 1 may include a sensor.

The HDA has a magnetic disk (hereinafter, called disk) 10, a spindle motor (hereinafter, called SPM) 12, an arm 13 equipped with a head 15, and a voice coil motor (hereinafter, called VCM) 14. The disk 10 is attached to the SPM 12 and is rotated by driving of the SPM 12. The arm 13 and the VCM 14 constitute an actuator AC. The actuator AC controls and moves the head 15 mounted on the arm 13 to a particular position on the disk 10 by driving of the VCM 14. The numbers of the disk 10 and the head 15 may be two or more each.

The magnetic disk device 10 has a recording region that is assigned a data region 10a usable for the user and a system area 10b where information necessary for system management is written.

The head 15 includes a slider as a main body, and a write head 15W and a read head 15R mounted on the slider. The write head 15W writes data on the disk 10. The read head 15R reads data stored in the disk 10.

The driver IC 20 controls the driving of the SPM 12 and the VCM 14 under control of the system controller 130 (specifically, an MPU 60 described later).

The head amplifier IC (pre-amplifier) 30 includes a read amplifier and a write driver. The read amplifier amplifies a read signal read from the disk 10 and outputs the same to the system controller 130 (specifically, a read/write (R/W) channel 40 described later). The write driver outputs write current according to a signal output from the R/W channel 40 to the head 15.

The volatile memory 70 is a semiconductor memory where saved data is lost when power supply is cut. The volatile memory 70 stores data necessary for processing at the individual components of the magnetic disk device 1 and others. The volatile memory 70 is a dynamic random access memory (DRAM) or synchronous dynamic random access memory (SDRAM), for example.

The buffer memory 80 is a semiconductor memory that temporarily records data and others transmitted and received between the magnetic disk device 1 and the host 100. The buffer memory 80 may be integrally formed with the volatile memory 70. The buffer memory 80 is a DRAM, static random access memory (SRAM), SDRAM, ferroelectric random access memory (FeRAM), or magnetoresistive random access memory (MRAM), for example.

The non-volatile memory 90 is a semiconductor memory that records saved data even when power supply is cut. The non-volatile memory 90 is an NOR-type or NAND-type flash read only memory (FROM), for example.

The system controller (controller) 130 is implemented by a large-scale integrated circuit (LSI) called system-on-a-chip (SoC) in which a plurality of elements is integrated on a single chip, for example. The system controller 130 includes a read/write (R/W) channel 40, a hard disk controller (HDC) 50, a microprocessor (MPU) 60, and others. The system controller 130 is electrically connected to the driver IC 20, the head amplifier IC 30, the volatile memory 70, the buffer memory 80, the non-volatile memory 90, and the host system 100, for example.

The R/W channel 40 executes signal processing of read data transmitted from the disk 10 to the host 100 and write data transmitted from the host 100 according to instructions from the MPU 60 described later. The R/W channel 40 has a circuit or a function to measure signal quality of read data. The R/W channel 40 is electrically connected to the head amplifier IC 30, the HDC 50, and the MPU 60, for example.

The HDC 50 controls data transmission between the host 100 and the R/W channel 40 according to instructions from the MPU 60 described later. The HDC 50 is electrically connected to the R/W channel 40, the MPU 60, the volatile memory 70, the buffer memory 80, and the non-volatile memory 90, for example.

The MPU 60 is a main controller that controls the individual components of the magnetic disk device 1. The MPU 60 executes servo control to control the VCM 14 via the driver IC 20 and perform positioning of the head 15. The MPU 60 controls the write action of data into the disk 10 and selects the destination to save the write data. The MPU 60 controls the read action of data from the disk 10 and controls processing of the read data. The MPU 60 is connected to the individual components of the magnetic disk device 1. The MPU 60 is electrically connected to the driver IC 20, the R/W channel 40, and the HDC 50, for example.

The MPU 60 includes a read/write controller 61, an estimation unit 62, and a suppression unit 63. The MPU 60 executes processing by these components, for example, the read/write controller 61, the estimation unit 62, and the suppression unit 63 on firmware. The MPU 60 may include these components as circuits.

The read/write controller 61 controls data read processing and data write processing according to commands from the host 100. The read/write controller 61 controls the VCM 14 via the driver IC 20 and performs positioning of the head 15 on the disk 10 in a particular position to read or write data.

The estimation unit 62 estimates a frequency component resulting from disturbance having a harmonic (hereinafter, called disturbance component) from a particular signal. For example, the estimation unit 62 detects frequency components within a range of particular frequencies (hereinafter, called first range) of a signal corresponding to an error (hereinafter, simply called position error) in a target position of the head 15 (hereinafter, called target position) in the disk 10, and estimates the disturbance component (hereinafter, called first estimated component) from the detected frequency components. Hereinafter, an example of estimation using the position error will be described as an example. However, the estimation unit 62 may perform an estimation using the signal detected by a sensor instead of the position error. In this example, the first range is equivalent to a range of frequencies of a fundamental wave of disturbance having an assumed harmonic, for example, frequencies corresponding to influence exerted on the magnetic disk device 1 when a cooling fan provided in a server is driven at the maximum number of rotations, for example, 500 Hz and less. When having estimated the first estimated component, the estimation unit 62 detects frequency components in the position error in a particular frequency range different from the first range (hereinafter, called second range) in the position error, and estimates from the detected frequency components a frequency component (hereinafter, called first multiple component) corresponding to a frequency of integral multiple of 2 or larger (hereinafter, called first multiple frequency) of a frequency of the first estimated component (hereinafter, called first estimated frequency). In this example, the second range is a range near the first multiple frequency, for example. In other words, the second range is a range including the first multiple frequency, for example. The second range is smaller than the first range. When having estimated the first multiple component, the estimation unit 62 estimates the existence of a disturbance having a first harmonic component in a plurality of frequency components (hereinafter, called first harmonic components) of frequencies of positive integral multiples of the first estimated frequency, except for the first estimated component and the first multiple component. In other words, when having estimated the first estimated component and the first multiple component, the estimation unit 62 determines that the position error has the first harmonic components. Hereinafter, the disturbance component estimated in the first range will also be simply called estimated component, and the disturbance component estimated in the second range will also be simply called multiple component. In addition, the frequency components corresponding to the frequencies of positive integral multiples of the estimated component will also be simply called harmonic components.

The estimation unit 62 further detects again the frequency components in the first range, and estimates an estimated component (hereinafter, called second estimated component) different from the first estimated component, from the detected frequency components. When having estimated the second estimated component, the estimation unit 62 calculates the common divisors of the first estimated frequency and the frequency of the second estimated component (hereinafter, called second estimated frequency). The estimation unit 62 calculates the remaining common divisors (hereinafter, called common divisor group) by eliminating 1 from the calculated common divisors. The estimation unit 62 detects frequency components in the position error in a range (hereinafter, called third range) near the greatest common divisor in the common divisor group (hereinafter, called first greatest value) in the position error, and estimates the frequency component (hereinafter, called third estimated component) corresponding to the first greatest value from the detected frequency components. In this example, the third range is included in the first range, for example, and is smaller than the first range. The third range includes the frequency of the third estimated component (hereinafter, called third estimated frequency). When having estimated the third estimated component, the estimation unit 62 estimates that there is a disturbance having a harmonic component of the third estimated frequency (hereinafter, called second harmonic component) in the position error. When having estimated the third estimated component, the estimation unit 62 detects frequency components in a range (hereinafter, called fourth range) near the greatest common divisor (hereinafter, called second greatest value) in the common divisor group except for the first greatest value, and estimates the frequency component (hereinafter, called fourth estimated component) corresponding to the second greatest value from the detected frequency components. Unlike the third range, the fourth range is included in the first range and is smaller than the first range. The fourth range includes a frequency of the fourth estimated component (hereinafter, called fourth estimated frequency). When the fourth estimated component is estimated, the estimation unit 62 estimates that there is a disturbance having a harmonic component of the fourth estimated frequency (hereinafter, called third harmonic component) in the position error. In the following description, the greatest common divisor in the common divisor group will also be simply called greatest value.

The suppression unit 63 suppresses the disturbance component in a particular signal. For example, when having estimated the estimated component and having not estimated the multiple component, the suppression unit 63 determines that there is no harmonic component in the position error and suppresses only the estimated component. For example, when having estimated the estimated component and having not estimated the multiple component, the suppression unit 63 determines that the disturbance has no harmonic in the position error and does not need to perform any operation. When having estimated the estimated component and the multiple component, the suppression unit 63 suppresses the harmonic component in the position error. The suppression unit 63 has a plurality of filters. For example, when having estimated the estimated component and having not estimated the multiple component, the suppression unit 63 determines that there is no harmonic component in the position error and applies a filter for suppressing only the estimated component. The filter is an adaptive filter, for example. For example, when having estimated the estimated component and having not detected the multiple component, the suppression unit 63 determines that the disturbance has no harmonic in the position error and does not need to apply any filter. When having estimated the estimated component and the multiple component, the suppression unit 63 applies a filter for suppressing the harmonic component in the position error.

Figure 2:
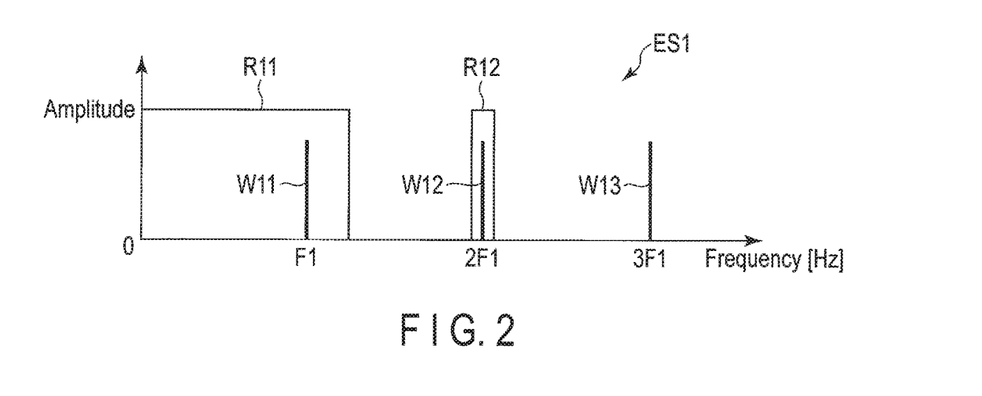
FIG. 2 is a diagram illustrating an example of a method for suppressing a disturbance component according to the embodiment.

FIG. 2 is a diagram illustrating an example of a method for suppressing a disturbance component according to the present embodiment. Referring to FIG. 2, the lateral axis indicates the frequency [Hz] of the position error and the vertical axis indicates the amplitude. FIG. 2 illustrates a first range R11 and a second range R12. Referring to FIG. 2, a position error ES1 includes a frequency component W11 of a frequency F1, a frequency component W12 of a frequency 2F1, and a frequency component W13 of a frequency 3F1. The frequency component W11 is equivalent to a first estimated component, and the frequency F1 is equivalent to a first estimated frequency. The frequency component W12 is equivalent to a first multiple component, and the frequency 2F1 is equivalent to a first multiple frequency. The frequency 2F1 is a frequency that is twice the frequency F1. The frequency components W11, W12, and W13 are equivalent to the first harmonic components corresponding to the frequencies of a positive integral multiple of the frequency F1. The frequency 3F1 is a frequency that is three times the frequency F1. Referring to FIG. 2, the second range R12 is a range near the first multiple frequency 2F1.

In the example illustrated in FIG. 2, the MPU 60 detects frequency components in the first range R11 in the position error ES1, and estimates the frequency component W11 from the detected frequency components as first estimated component. When having estimated the first estimated component W11, the MPU 60 detects frequency components in the second range R12 in the position error ES1, and estimates the first multiple component W12 corresponding to the first multiple frequency 2F1 from the detected frequency components. When having estimated the first multiple component W12, the MPU 60 estimates that there is a disturbance having the first harmonic components W11, W12, and W13, and suppresses the first harmonic components W11, W12, and W13. The MPU 60 performs positioning of the head 15 based on the position error ES1 with the first harmonic components W11, W12, and W13 suppressed. The MPU 60 detects again the frequency components in the first range R11, and estimates the second estimated component from the detected frequency components. When the second estimated component cannot be estimated, the MPU 60 terminates the process. When the second estimated component cannot be estimated, the first estimated component W11 may be a disturbance component, for example, a fundamental frequency under influence on the magnetic disk device 1 caused by driving of the cooling fan provided in the server. In this manner, by determining whether the first multiple component corresponding to the first multiple frequency of the first estimated frequency of the first estimated component can be estimated or not in the second range, the MPU 60 can determine whether there exists the first harmonic components of the first estimated frequency. When having determined that there exist the first harmonic components in the position error, the MPU 60 can suppress the first harmonic components.

Figure 3:
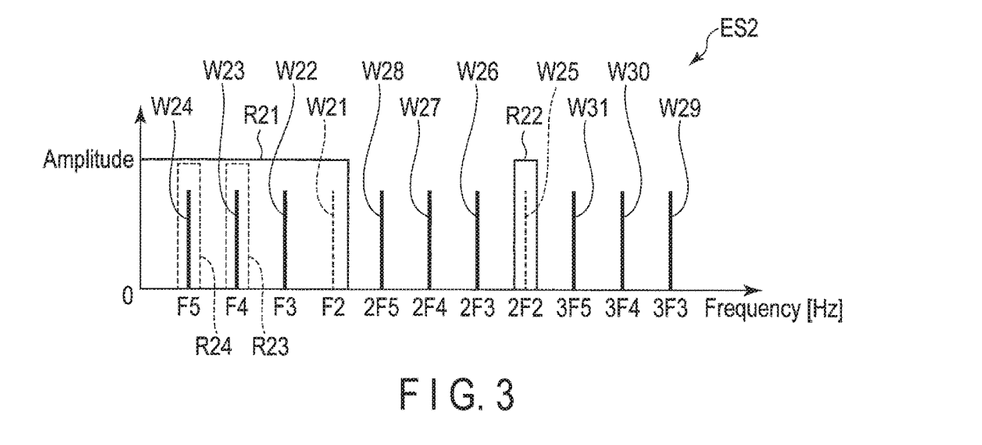
FIG. 3 is a diagram illustrating an example of a method for suppressing a disturbance component according to the embodiment.

FIG. 3 is a diagram illustrating an example of a method for suppressing a disturbance component according to the present embodiment. Referring to FIG. 3, the lateral axis indicates the frequency [Hz] of the position error and the vertical axis indicates the amplitude. FIG. 3 illustrates a first range R21 and a second range R22. Referring to FIG. 3, a position error ES2 includes a frequency component W21 of a frequency F2, a frequency component W22 of a frequency F3, a frequency component W23 of a frequency F4, a frequency component W24 of a frequency F5, a frequency component W25 of a frequency 2F2, a frequency component W26 of a frequency 2F3, a frequency component W27 of a frequency 2F4, a frequency component W28 of a frequency 2F5, a frequency component W29 of a frequency 3F3, a frequency component W30 of a frequency 3F4, and a frequency component W31 of a frequency 3F5. The frequency component W21 is equivalent to the first estimated component, and the frequency F2 is equivalent to the first estimated frequency. The frequency component W25 is equivalent to the first multiple component, and the frequency 2F2 is equivalent to the first multiple frequency. The frequency 2F2 is a frequency that is twice the frequency F2. The frequency component W22 is equivalent to the second estimated component, and the frequency F3 is equivalent to the second estimated frequency. The frequency component W23 is equivalent to the third estimated component, and the frequency F4 is equivalent to the third estimated frequency. The frequency component W24 is equivalent to the fourth estimated component, and the frequency F5 is equivalent to the fourth estimated frequency. The frequency components W21 and W25 are equivalent to the first harmonic components corresponding to the frequencies of a positive integral multiple of the frequency F2. The frequency components W21, W22, W23, W25, W26, W27, W29, and W30 are equivalent to the second harmonic components corresponding to the frequencies of a positive integral multiple of the frequency F4. The frequency components W21 to W30 are equivalent to the third harmonic components corresponding to the frequencies of a positive integral multiple of the frequency F5. Referring to FIG. 3, the second range R22 is a range near the first multiple frequency 2F2.

In the example illustrated in FIG. 3, the MPU 60 detects frequency components in the first range R21 in the position error ES2, and estimates the frequency component W21 from the detected frequency components as first estimated component. When having estimated the first estimated component W21, the MPU 60 detects frequency components in the second range R22 in the position error ES2, and estimates the first multiple component W25 corresponding to the first multiple frequency 2F2 from the detected frequency components. When having estimated the first multiple component W25, the MPU 60 estimates the first harmonic components W21 and W25, and suppresses the first harmonic components W21 and W25. In other words, when having estimated the first multiple component W25, the MPU 60 applies a filter for suppressing the first harmonic components W21 and W25. The MPU 60 detects again the frequency components in the first range R21, and estimates the second estimated component W22 from the detected frequency components. When having estimated the second estimated component W22, the MPU 60 calculates common divisors of the first estimated frequency F2 and the second estimated frequency F3, and calculates a common divisor group by eliminating 1 from the calculated common divisors. The MPU 60 detects frequency components in the third range R23 near the first greatest value in the common divisor group in the position error ES2, and estimates the third estimated component W23 from the detected frequency components. When having estimated the third estimated component W23, the MPU 60 suppresses the second harmonic components W22, W23, W26, W27, W29, and W30 except for the already suppressed first harmonic components W21 and W25. In other words, when having estimated the first multiple component W25, the MPU 60 applies a filter for suppressing the second harmonic components W22, W23, W26, W27, W29, and W30 except for the already suppressed first harmonic components W21 and W25 in the position error ES2. The MPU 60 detects frequency components in the fourth range R24 near the second greatest value in the common divisor group except for the first greatest value in the position error ES2, and estimates the fourth estimated component W24 corresponding to the second greatest value from the detected frequency components. When having estimated the fourth estimated component W24, the MPU 60 suppresses third harmonic components W24 and W28 except for the already suppressed first harmonic component and second harmonic components W21, W22, W23, W25, W26, W27, W29, and W30. In other words, when having estimated the fourth estimated component W24, the MPU 60 applies a filter for suppressing the third harmonic components W24 and W28 except for the already suppressed first harmonic component and second harmonic components W21, W22, W23, W25, W26, W27, W29, and W30 in the position error ES2. The MPU 60 repeats a process of detecting frequency components in a range near the greatest value in the common divisor group except for the already suppressed common divisors in the position error ES2, estimating the estimated component corresponding to the greatest value from the detected frequency components, and suppressing a harmonic component corresponding to the estimated component except for the already suppressed harmonic components until the number of member of the common divisor group becomes zero. In other words, when having estimated the estimated component, the MPU 60 applies a filter for suppressing a harmonic component corresponding to the estimated component except for the already suppressed harmonic component in the position error ES2. The MPU 60 performs positioning of the head 15 based on the position error ES2 in which the harmonic components corresponding to all the estimated components is suppressed. In this manner, by repeatedly estimating the estimated component in the first range, the MPU 60 can estimate the disturbance component in the first range of the position error even if there occurs decrease in the frequency, for example, the basic frequency corresponding to the influence on the magnetic disk device 1 caused by a disturbance, for example, reduction in the number of rotations of the cooling fan provided in the server.

Figure 4:
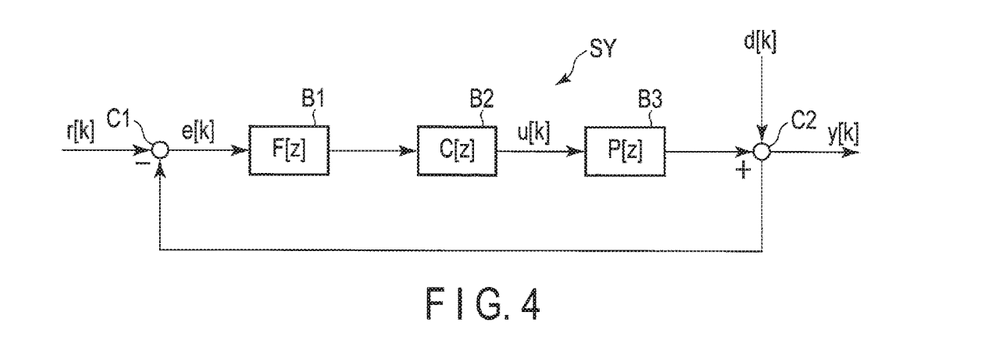
FIG. 4 is a block diagram illustrating an example of a head positioning control system according to the embodiment.

FIG. 4 is a block diagram illustrating an example of a positioning control system SY of the head 15 according to the present embodiment.

The magnetic disk device 1 has the positioning control system SY of the head 15. The positioning control system SY includes a filter B1, a controller B2, a plant B3, and computing units C1 and C2. The plant B3 corresponds to the head 15 and the actuator AC, for example.

The filter B1 suppresses a specific frequency component, for example, a disturbance component of an input signal. The filter B1 suppresses the disturbance component of a position error e[k] as a differential value between a target position r[k] and current position y[k] on the disk 10 of the plant B3 (hereinafter, called actual position). When the estimated component is estimated and the multiple component cannot be estimated, the filter B1 suppresses only the estimated component in the position error e[k]. When the estimated component is estimated and the multiple component is estimated, the filter B1 suppresses a harmonic component of the estimated component in the position error e[k]. In other words, the filter B1 has a plurality of filters. When the estimated component is estimated and the multiple component cannot be estimated, a filter for suppressing only the estimated component in the position error e[k] is applied as filter B1. When the estimated component is estimated and the multiple component cannot be estimated, it is determined that the disturbance has no harmonic component, and thus nothing may be applied. When the estimated component is estimated and the multiple component is estimated, a filter for suppressing a harmonic component of the estimated component in the position error e[k] is applied as filter B1. The filter B1 may be included in the suppression unit 63. For the filter B1, elements other than frequency, for example, gain and the range of frequencies to be suppressed may be arbitrarily set.

The controller B2 controls the plant B3, for example. The controller B2 generates control input u[k] of the plant B3 based on the position error e[k].

The controller B2 may generate the control input u[k] of the plant B3 based on the position error e[k] and a value other than the position error e[k].

The plant B3 is driven based on the control input u[k].

The computing unit C1 accepts input of the target position r[k] and the actual position y[k]. When the target position r[k] and the actual position y[k] are input, the computing unit C1 outputs the position error e[k] as the differential value between the target position r[k] and the actual position y[k] to the filter B1. When the position error e[k] is input, the filter B1 outputs a signal for suppressing the disturbance component to the controller B2. When the signal for suppressing the disturbance component is input, the controller B2 outputs the control input u[k] to the plant B3. When the control input u[k] is input, the plant B3 is driven according to the control input u[k] and outputs a signal corresponding to the control input u[k] to the computing unit C2. When the signal corresponding to the control input u[k] and a disturbance d[k] are input, the computing unit C2 outputs the actual position y[k] to which the disturbance d[k] is added to the control input u[k] to the computing unit C1 and moves the head 15 to the actual position y[k].

Figure 5:
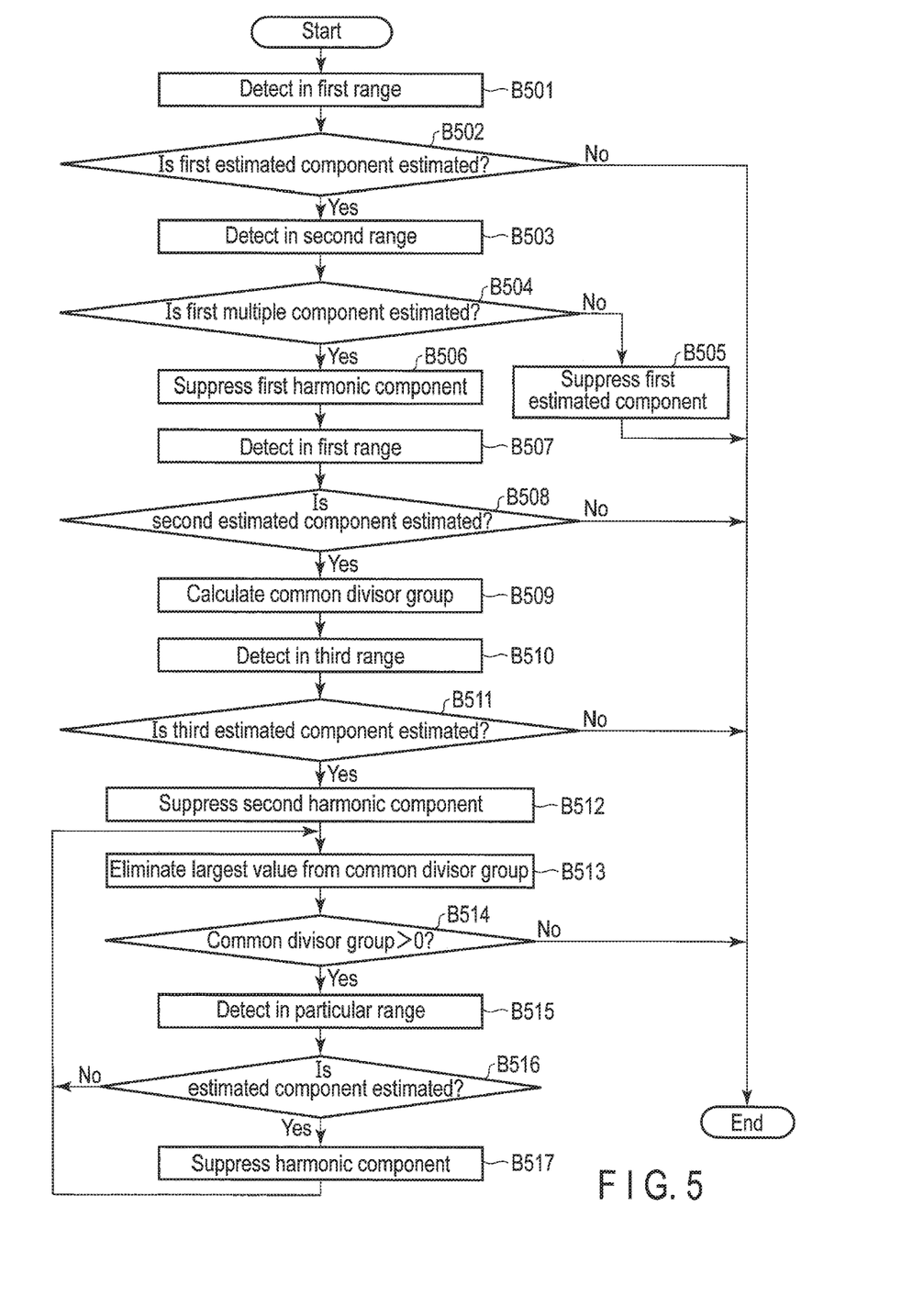
FIG. 5 is a flowchart of an example of a method for suppressing a disturbance component according to the embodiment.

FIG. 5 is a flowchart of an example of a method for suppressing the disturbance component according to the present embodiment.

The MPU 60 detects frequency components in the first range in the position error (B501), and determines whether the first estimated component can be estimated from the detected frequency components (B502). When having determined that the first estimated component cannot be estimated (NO in B502), the MPU 60 terminates the process. The MPU 60 detects frequency components in the second range in the position error (B503), and determines whether the first multiple component can be estimated from the detected frequency components (B504).

When having determined that the first multiple component cannot be estimated (NO in B504), the MPU 60 suppresses the first estimated component (B505), and controls the head 15 based on the position error in which the first estimated component is suppressed, and then terminates the process. When having determined that the first multiple component can be estimated (YES in B504), the MPU 60 suppresses the first harmonic component (B506). The MPU 60 detects again frequency components in the first range (B507), and determines whether the second estimated component can be estimated from the detected frequency components (B508). When having determined that the second estimated component cannot be estimated (NO in B508), the MPU 60 controls the head 15 based on the error signal in which the first harmonic component is suppressed, and then terminates the process. When having determined that the second estimated component can be estimated (YES in B508), the MPU 60 calculates the common divisor group in which 1 is subtracted from the common divisor of the first estimated frequency of the first estimated component and the second estimated frequency of the second estimated component (B509).

The MPU 60 detects frequency components in the third range (B510), and determines whether the third estimated component can be estimated from the detected frequency components (B511). When having determined that the third estimated component cannot be estimated (NO in B511), the MPU 60 controls the head 15 based on the error signal in which the first harmonic component is suppressed, and then terminates the process. When having determined that the third estimated component can be estimated (YES in B511), the MPU 60 suppresses the second harmonic component (B512). The MPU 60 eliminates the greatest value from the common divisor group (B513). For example, the MPU 60 eliminates the first greatest value from the common divisor group. The MPU 60 determines whether the number of members of the common divisor group is larger than 0 or not (B514). When having determined that the number of members of the common divisor group is larger than 0 (YES in B514), the MPU 60 detects frequency components in a particular range (B515), and determines whether the estimated component can be estimated from the detected frequency components (B516). For example, the MPU 60 detects frequency components in the fourth range, and determines whether the fourth estimated component can be estimated from the detected frequency components. When having determined that the estimated component cannot be estimated (NO in B516), the MPU 60 moves the process to B513. When having determined that the estimated component can be estimated (YES in B516), the MPU 60 suppresses the harmonic component and moves the process to B513. When having determined that the number of members of the common divisor group is not larger than 0, that is, the number of members of the common divisor group is 0 (NO in B514), the MPU 60 controls the head 15 based on the error signal in which the harmonic component is suppressed, and terminates the process. For example, the MPU 60 controls the head 15 based on the error signal in which the first harmonic component and the second harmonic component other than the first harmonic component are suppressed, and terminates the process.

According to the present embodiment, the magnetic disk device 1 detects frequency components in the first range in the position error, and estimates the first estimated component from the detected frequency components. When the first estimated component is estimated, the magnetic disk device 1 detects frequency components in the second range in the position error, and estimates the first multiple component from the detected frequency components. When having estimated the first estimated component and the first multiple component, the magnetic disk device 1 estimates the first harmonic component of the first estimated frequency of the first estimated component, and suppresses the estimated first harmonic component. The magnetic disk device 1 detects frequency components again in the first range, and estimates the second estimated component from the detected frequency components. When having estimated the second estimated component, the magnetic disk device 1 calculates the common divisors of the first estimated frequency of the first estimated component and the second estimated frequency of the second estimated component, and calculates the common divisor group except for 1 from the calculated common divisors. The magnetic disk device 1 detects frequency components in the third range near the first greatest value in the common divisor group, and estimates the third estimated component corresponding to the first greatest value from the detected frequency components. The magnetic disk device 1 suppresses the second harmonic component except for the already suppressed first harmonic component. The magnetic disk device 1 repeats a process of estimating the estimated component corresponding to the greatest value in the common divisor group except for the already suppressed common divisors, and suppressing a harmonic component corresponding to the estimated component except for the already suppressed harmonic components until the number of member of the common divisor group becomes zero in the position signal. Accordingly, even with the occurrence of disturbance, for example, a change in the number of rotations of the cooling fan provided in the server, the magnetic disk device 1 can suppress the disturbance component in the position error of the head 15. Therefore, the magnetic disk device 1 can improve the accuracy of positioning control of the head 15.

Next, a magnetic disk device according to a first modification example will be described. In relation to the first

First Modification Example

Figure 6:
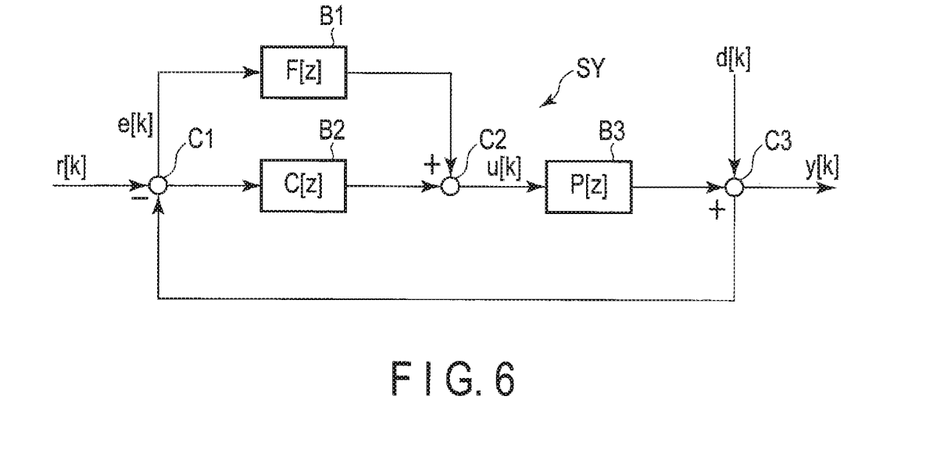
FIG. 6 is a block diagram illustrating an example of a head positioning control system according to a first modification example.

A magnetic disk device 1 in the first modification example is different from those in the foregoing embodiment in a positioning control system SY of a head 15.

FIG. 6 is a block diagram illustrating an example of the positioning control system SY of the head 15 according to the first modification example.

The magnetic disk device 1 further includes a computing unit C3.

The computing unit C1 accepts input of the target position r[k] and the actual position y[k]. When the target position r[k] and the actual position y[k] are input, the computing unit C1 outputs a position error e[k] as the differential value between the target position r[k] and the actual position y[k] to a filter B1 and a controller B2. When the position error e[k] is input, the filter B1 outputs the position error e[k] with the disturbance component suppressed to a computing unit C2. When the position error e[k] is input, the controller B2 outputs a control input u[k] to the computing unit C2. When the signal for suppressing the disturbance component and the control input u[k] is input, the computing unit C2 outputs the control input u[k] to which the position error e[k] with the disturbance component suppressed is added, to a plant B3. With the input of the control input u[k] to which the position error e[k] with the disturbance component suppressed is added, the plant B3 is driven according to the control input u[k] and outputs a signal corresponding to the control input u[k] to the computing unit C3. When the signal corresponding to the control input u[k] and a disturbance d[k] are input, the computing unit C3 outputs the actual position y[k] to which the disturbance d[k] is added to the control input u[k] to the computing unit C1 and moves the head 15 to the actual position y[k].

According to the first modification example, the magnetic disk device 1 has the positioning control system SY of the head 15 including the filter B1 connected in parallel to the controller B2. Therefore, the magnetic disk device 1 can improve the accuracy of positioning control of the head 15.

Second Modification Example

A magnetic disk device 1 in a second modification example is different in configuration from those in the foregoing embodiment and the first modification example.

Figure 7:
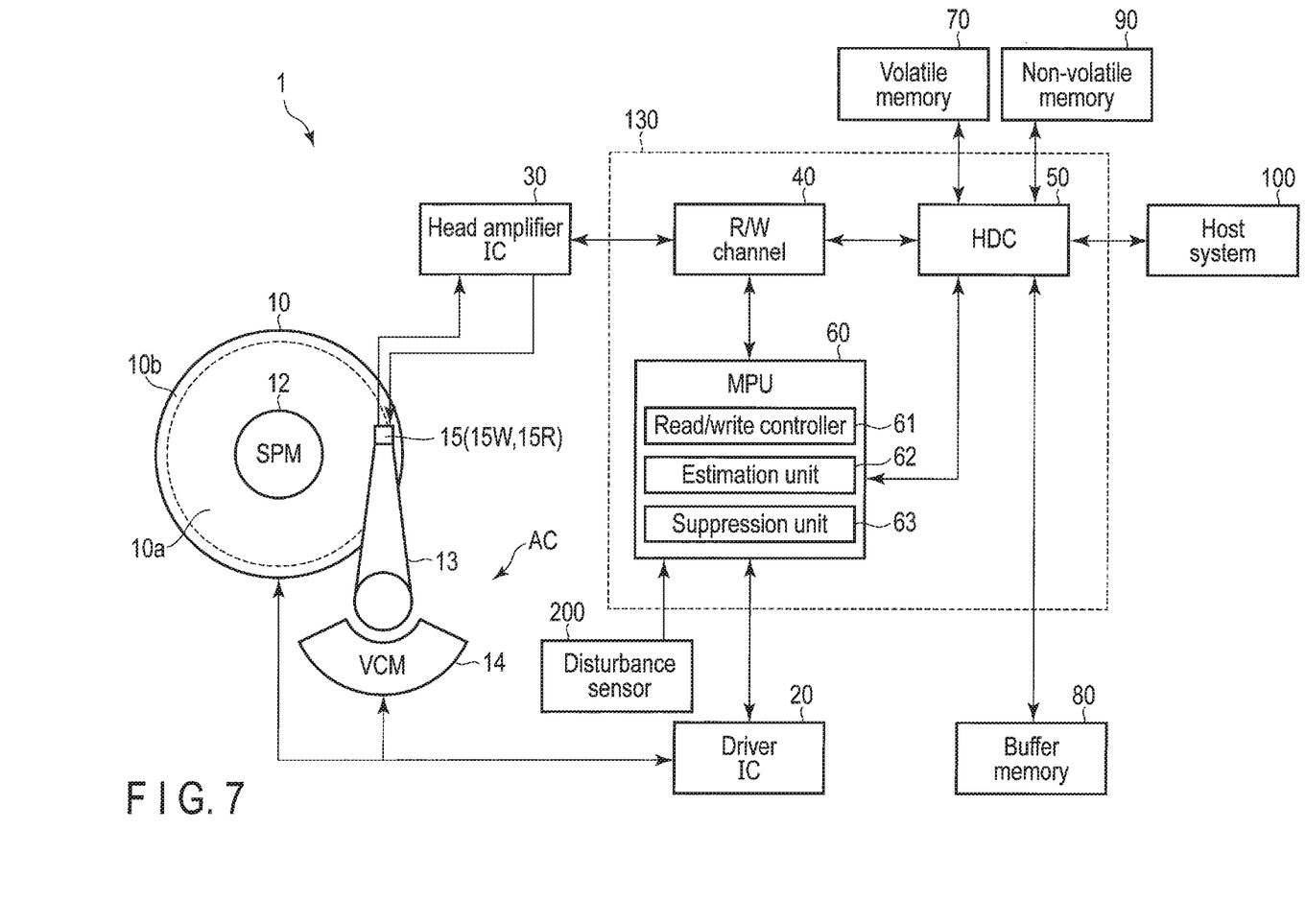
FIG. 7 is a block diagram illustrating a configuration of a magnetic disk device according to a second modification example.

FIG. 7 is a block diagram illustrating a configuration of a magnetic disk device according to a second modification example.

The magnetic disk device 1 further includes a disturbance sensor 200. The disturbance sensor 200 detects a disturbance applied to the magnetic disk device 1. In the example illustrated in FIG. 7, the disturbance sensor 200 is electrically connected to an MPU 60 of a system controller 130. The disturbance sensor 200 inputs a signal related to the detected disturbance (hereinafter, called disturbance signal) to the MPU 60. The disturbance sensor 200 may be mounted on an HDA or may be mounted on a printed circuit board (PCB).

The MPU 60 estimates the disturbance component having a harmonic from a particular disturbance signal. The MPU 60 detects frequency components in a particular frequency range of the particular disturbance signal, and estimates the disturbance component from the detected frequency components. For example, when having estimated the estimated component and having not estimated the multiple component, the MPU 60 determines that the disturbance has no harmonic in the disturbance signal and does not need to perform any operation. When the estimated component and the multiple component are estimated, the MPU 60 suppresses the harmonic component in the position error. The MPU 60 has a plurality of filters. For example, when having estimated the estimated component and having not estimated the multiple component, the MPU 60 determines that there is no harmonic component in the disturbance signal and applies a filter for suppressing only the estimated component. For example, when having estimated the estimated component and having not estimated the multiple component, the MPU 60 determines that the disturbance has no harmonic in the disturbance signal and does not need to apply a filter. When the estimated component and the multiple component are estimated, the MPU 60 applies a filter for suppressing the harmonic component in the position error.

According to the second modification example, the magnetic disk device 1 includes the disturbance sensor 200. The magnetic disk device 1 can estimate the disturbance component with a harmonic from the disturbance signal. Therefore, the magnetic disk device 1 can improve the accuracy of positioning control of the head 15.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head that writes data into the disk and reads data from the disk; and
   a controller that estimates a first frequency component resulting from a disturbance in a first range of a frequency corresponding to the disturbance in a signal with the disturbance, when having estimated the first frequency component, estimates a second frequency component corresponding to a second frequency of a positive integral multiple of 2 or larger of a first frequency of the first frequency component in a second range different from the first range, and when having estimated the second frequency component, suppresses a first harmonic component corresponding to the positive integral multiple of the first frequency in a position error of a target position of the head on the disk.

2. The magnetic disk device according to claim 1, wherein when having estimated the second frequency component, the controller applies a first filter for suppressing the first harmonic component in the position error.

3. The magnetic disk device according to claim 1, wherein the controller estimates a third frequency component different from the first frequency component resulting from the disturbance in the first range, estimates a fourth frequency component corresponding to a first greatest value that is largest among first common divisors in which 1 is eliminated from common divisors of the first frequency and a third frequency of the third frequency component, and when having estimated the fourth frequency component, suppresses a second harmonic component corresponding to a positive integral multiple of a fourth frequency of the fourth frequency component except for the first harmonic component in the position error.

4. The magnetic disk device according to claim 3, wherein when having estimated the fourth frequency component, the controller applies a second filter for suppressing the second harmonic component except for the first harmonic component in the position error.

5. The magnetic disk device according to claim 3, wherein the controller estimates a fifth frequency component corresponding to a second greatest value that is largest among the first common divisors except for the first greatest value, and suppresses a third harmonic component corresponding to a positive integral multiple of a fifth frequency of the fifth frequency component except for the first harmonic component and the second harmonic component in the position error.

6. The magnetic disk device according to claim 5, wherein the controller repeats a process of estimating a sixth frequency component corresponding to the largest value among the first common divisors except for the common divisors corresponding to the suppressed harmonic components and suppressing a harmonic component corresponding to a positive integral multiple of a sixth frequency component except for the suppressed harmonic components in the position error until the number of the first common divisors becomes zero.

7. The magnetic disk device according to claim 1, wherein when the second frequency component cannot be estimated, the controller suppresses the first frequency component in the position error.

8. The magnetic disk device according to claim 7, wherein when the second frequency component cannot be estimated, the controller applies a first filter for suppressing the first frequency component in the position error.

9. The magnetic disk device according to claim 1, wherein the second range is a range that includes the second frequency and is smaller than the first range.

10. The magnetic disk device according to claim 1, wherein the signal is a signal corresponding to the position error.

11. A method for suppressing a disturbance component with a harmonic, the method being applied to a magnetic disk device including a disk and a head that writes data into the disk and reads data from the disk, the method comprising:
estimating a first frequency component resulting from a disturbance in a first range of a frequency corresponding to the disturbance in a signal with the disturbance;
when having estimated the first frequency component, estimating a second frequency component corresponding to a second frequency of a positive integral multiple of 2 or larger of a first frequency of the first frequency component in a second range different from the first range; and
when having estimated the second frequency component, suppressing a first harmonic component corresponding to the positive integral multiple of the first frequency in a position error in a target position of the head on the disk.

12. The method for suppressing a disturbance component with a harmonic according to claim 11, further comprising, when the second frequency component has been estimated:
applying a first filter for suppressing the first harmonic component in the position error.

13. The method for suppressing a disturbance component with a harmonic according to claim 11, further comprising:
estimating a third frequency component different from the first frequency component resulting from the disturbance in the first range;
estimating a fourth frequency component corresponding to a first greatest value that is largest among first common divisors in which 1 is eliminated from common divisors of the first frequency and a third frequency of the third frequency component; and
when having estimated the fourth frequency component, suppressing a second harmonic component corresponding to a positive integral multiple of a fourth frequency of the fourth frequency component except for the first harmonic component in the position error.

14. The method for suppressing a disturbance component with a harmonic according to claim 13, further comprising:
when the fourth frequency component has been estimated, applying a second filter for suppressing the second harmonic component except for the first harmonic component in the position error.

15. The method for suppressing a disturbance component with a harmonic according to claim 13, further comprising:
estimating a fifth frequency component corresponding to a second greatest value that is largest among the first common divisors except for the first greatest value; and
suppressing a third harmonic component corresponding to a positive integral multiple of a fifth frequency of the fifth frequency component except for the first harmonic component and the second harmonic component in the position error.

16. The method for suppressing a disturbance component with a harmonic according to claim 15, further comprising repeating a process of:
estimating a sixth frequency component corresponding to the largest value among the first common divisors except for the common divisors corresponding to the suppressed harmonic components; and
suppressing a harmonic component corresponding to a positive integral multiple of the sixth frequency component except for the suppressed harmonic components in the position error until the number of the first common divisors becomes zero.

17. The method for suppressing a disturbance component with a harmonic according to claim 11, further comprising:
when the second frequency component cannot be estimated, suppressing the first frequency component in the position error.

18. The method for suppressing a disturbance component with a harmonic according to claim 17, further comprising:
when the second frequency component cannot be estimated, applying a first filter for suppressing the first frequency component in the position error.

19. The method for suppressing a disturbance component with a harmonic according to claim 11, wherein the second range is a range including the second frequency and is smaller than the first range.

20. The method for suppressing a disturbance component with a harmonic according to claim 11, wherein the signal is a signal corresponding to the position error.

* * * * *